Aug. 6, 1929.                H. SHOEMAKER                1,723,583
                        ELECTRICAL RECTIFYING SYSTEM
                             Filed Jan. 12, 1926

INVENTOR.
Harry Shoemaker
BY
Mayer, Warfield & Watson
ATTORNEYS.

Patented Aug. 6, 1929.

1,723,583

UNITED STATES PATENT OFFICE.

HARRY SHOEMAKER, OF JERSEY CITY, NEW JERSEY, ASSIGNOR, BY MESNE ASSIGN-MENTS, TO P. R. MALLORY & CO. INCORPORATED, OF INDIANAPOLIS, INDIANA, A CORPORATION OF INDIANA.

ELECTRICAL RECTIFYING SYSTEM.

Application filed January 12, 1926. Serial No. 80,778.

This invention relates to an electrical system for rectifying alternating currents and more particularly to a system utilizing the unilateral conductivities of asymmetric cells and the like.

The object, generally, of the invention is to provide a simple and reliable rectifying system without moving parts, which is economical efficient and readily manufactured.

A more specific object is to provide a system in which commercial alternating supply voltages may be stepped down to suitable values to be used across asymmetric couples and at the same time maintain a good power factor on the line.

It is also an object to provide a system in which the maximum peaks of the rectified current have been smoothed out to a degree where the rectified current has sufficient steadiness for use directly in radio-receiving systems employing the usual hot filament vacuum tubes.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

Figure 1:
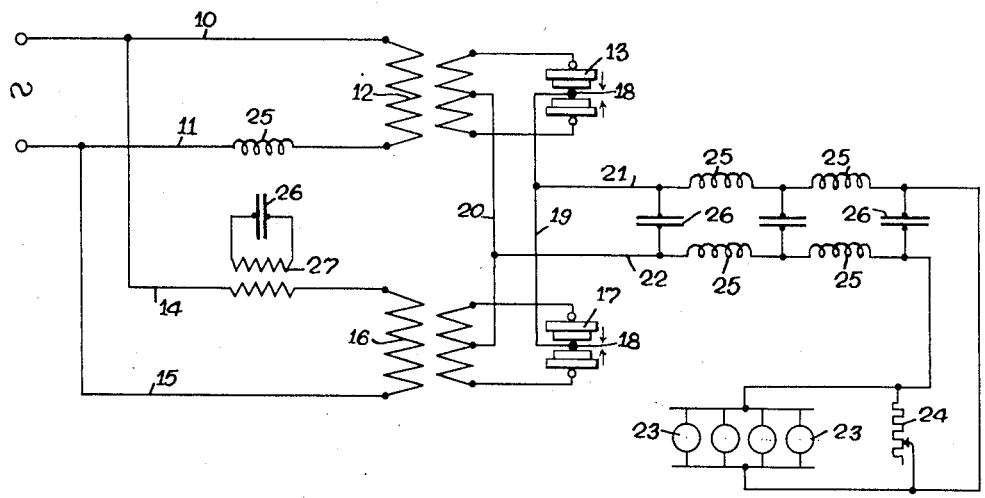
Figure 2:
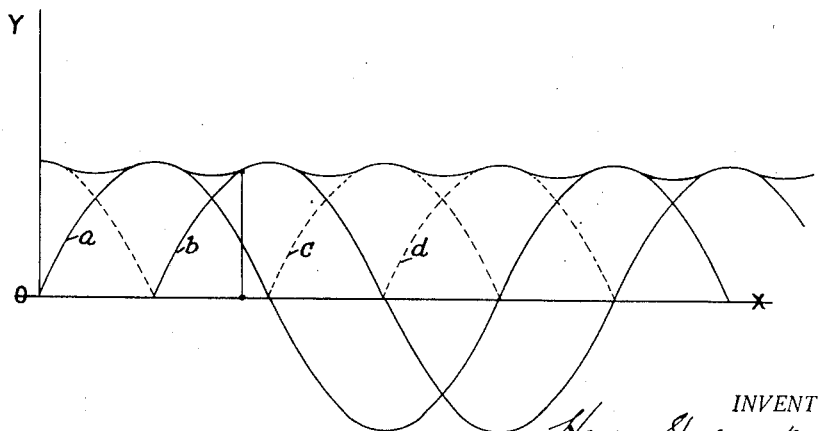

For a fuller understanding of the nature and objects of the invention reference should be had to the following detailed description taken in connection with the accompanying drawing, in which:

Figure 1 is a diagrammatic view illustrating schematically an electric system which is arranged in accordance with the invention for the rectification of alternating current; and Fig. 2 is an explanatory diagram for illustrating an operating characteristic of the system shown in Fig. 1.

Referring now to the drawing and particularly to Fig. 1 10 and 11 denote alternating current supply mains across which is connected the stepdown transformer 12 for supplying alternating current to the rectifying unit 13 which is arranged to supply direct current in accordance with the invention. 14 and 15 denote mains connected in parallel with mains 10 and 11 and leading from the common source alternating current supply to the step-down transformer 16 which is similar to the step-down transformer 12 and is arranged to supply the parallel rectifying unit 17.

The rectifying units 13 and 17 are similar and preferably arranged as indicated for full wave rectification. Any convenient type of rectifying unit may be employed, for example, the dry surface contact variety shown in the application for Letters Patent of the United States, filed by Samuel Ruben on September 22, 1924, Serial No. 739,188; as here illustrated it consists of a pair of electropositive and electronegative elements disposed to have unilateral conductivity, the elements being disposed in relatively inverted relations, so as to have the two ends of the rectifying unit with the same polarity, thereby providing a common intermediate terminal of the opposite polarity such as shown at 18. The terminals 18 in the two units 13 and 17 are connected by the common supply conductor 19, which comprises a supply main for one side of the direct current supply circuit and the other side of this circuit is provided by means of the conductor 20 which joins a middle or neutral point in the secondaries of the transformers 12 and 16 respectively. Leads 21 and 22 are shown respectively connected to the conducting mains 19 and 20 for supplying a direct current to a current consuming or translating device, such for example as the radio-tubes 23, which are shown as preferably shunted by a compensating resistance 24.

In order that such current consuming device shall be supplied with direct current of a character in which the maximum peaks are smoothed out to a relatively large degree, this circuit is bridged by means of a filter circuit which comprises portions of inductance 25 which are preferably inserted in both sides of the current consuming circuit across which are shunted portions of a distributed capacitance 26.

In order also that the maximum peaks in the rectified current from the parallel rectifying units 13 and 17 shall not be superimposed but shall be relatively displaced in order, thereby to facilitate the smoothing out of the rectified current by the filler circuit the supply currents for the transformers 12 and 16 are arranged to be relatively out of phase. It is preferable that this phase displacement in the alternating currents supplied to the respective transformers shall have equal and opposite phase-angle displacements so as thereby to compensate for each other and draw a current from the main alternating current supply which has substantial unity power factor. This substantially equal and opposite phase-angle displacement in the alternating currents supplied respectively to the transformers 12 and 16 is accomplished by inserting in the alternating current supply connections substantially equal but oppositely operating reactive elements in the respective connections. For example, the connections leading to the transformer 12 are shown as having a reactance 25 connected in series therewith. In like manner the connections leading to the transformer 16 are shown as provided with a capacitance 26 connected in series therewith through the current transformer 27. The transformer 27 is preferably a step-up transformer so that the condenser employed at 26 may utilize a high voltage and be of comparatively small physical size.

In operation, it is preferable that the sum of the two-phase-angle displacements shall total substantially 90°. Where this is accomplished the direct current pulses from the rectifying units will be superposed substantially as indicated in Fig. 2. If the sine wave indicated at $a$ indicates the pulses received from one side of the rectifying unit 13 the sine wave indicated at $b$ will represent corresponding pulses received from the rectifying unit 17 since these two sine waves have substantially 90° phase displacement. Similarly, the sine wave $c$ and $d$ indicate respectively the pulses from the other sides of the rectifying units 13 and 17 which are displaced 180° from the sine waves $a$ and $b$ respectively. By this arrangement it is seen that the direct current pulses which may be considered as that half of the alternating current sine waves above the O—X axis are supplied continuously to the mains 19 and 20 at intervals of 90 electrical degrees. By this arrangement it is seen that the function of the filter circuit in smoothing out the effect of the maximum peaks in the direct current supplied to the mains 19 and 20 is greatly facilitated since the phase displacement in the direct current pulses received from the rectifying units 13 and 17 operate mutually to fill in the gaps between the maximum peaks from the other.

The work of smoothing out the maximum peaks in the direct current supply circuit is further facilitated by the use of polarization cells as the capacitance units shown at 24.

When the arrangement shown in Fig. 1 is connected to supply direct current directly to the hot filaments of vacuum tubes in radio-receiving systems substantially no hum is appreciable by reason of the efficient smoothing out of the maximum peaks accomplished by this arrangement.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention what I claim as new and desire to secure by Letters Patent is:

1. In an electrical system adapted for the rectification of alternating currents, the combination with a single-phase source of alternating current, of a pair of rectifying units inductively connected to said source, having their alternating current-supply connections connected in parallel to said source, each unit comprising asymmetric couples of the dry surface contact variety, said couples being disposed in a unit in equal numbers in inverted relation, and having a common interposed electrode adapted to be connected to one side of a direct current supply circuit, and outer electrodes connected through said alternating current supply connections, said connections being arranged to provide a common terminal for the other side of said direct current circuit, inductance connected in series in the alternating current supply connections to one of said units, and capacitance connected in series in the connections to the other of said units; said inductance and capacitance being arranged to effect relatively opposite phase-angle displacements in the currents supplied respectively to said units.

2. In an electrical system adapted for the rectification of alternating currents, the combination with a single-phase source of alternating current, of a pair of rectifying units inductively connected to said source, having their alternating current-supply connections connected in parallel to said source, each unit comprising asymmetric couples of the dry surface contact variety, said couples being disposed in a unit in equal numbers in inverted relation, and having a common interposed electrode adapted to be connected to one side of a direct current-supply circuit and outer electrodes connected through said alternating current-supply connections, said connections being arranged to provide a common terminal for the other side of said direct current circuit, inductance connected in series in the alternating current-supply connections to one of said units, capacitance connected in series in the connections to the other of said units, and a filter connected to the direct current output terminals, said filter comprising elements of series inductance and shunt capacitance.

In testimony whereof I affix my signature.

HARRY SHOEMAKER.